United States Patent [19]

Fodor et al.

[11] Patent Number: 4,601,340

[45] Date of Patent: Jul. 22, 1986

[54] ALUMINUM CITRATE SOLUTION

[75] Inventors: Lawrence M. Fodor; R. Lynn Cobb, both of Bartlesville, Okla.

[73] Assignee: Phillips Petroleum Company, Bartlesville, Okla.

[21] Appl. No.: 525,911

[22] Filed: Aug. 24, 1983

[51] Int. Cl.[4] .......... E21B 33/13; C09K 3/00; C07F 5/06

[52] U.S. Cl. ............... 166/294; 252/8.55 D; 556/183; 556/179

[58] Field of Search ......... 166/285, 292, 294; 252/8.55 D, 8.5 B; 260/448 R, 448 B

[56] References Cited

U.S. PATENT DOCUMENTS

| | | | |
|---|---|---|---|
| 2,734,796 | 2/1956 | Ashiry et al. | 23/82 |
| 2,926,069 | 2/1960 | Perrin et al. | 23/52 |
| 3,200,136 | 8/1965 | Grossmith | 260/439 |
| 3,553,316 | 1/1971 | Rubino | 424/68 |
| 3,656,889 | 4/1972 | Olewinski | 23/52 |
| 3,762,476 | 10/1973 | Gall | 166/294 |
| 3,959,093 | 5/1976 | Merkyl | 204/72 |
| 4,162,923 | 7/1979 | Schmitt et al. | 106/104 |
| 4,447,364 | 5/1984 | Staal | 260/448 R |

OTHER PUBLICATIONS

Kirk-Othmer, 1978, Encyclopedia of Chemical Technology, Third Edition, vol. 2, pp. 197-208, John Wiley and Sons, New York.

Primary Examiner—Stephen J. Lechert, Jr.
Assistant Examiner—Howard J. Locker
Attorney, Agent, or Firm—Edward L. Bowman

[57] ABSTRACT

An aqueous aluminum citrate solution and its preparation from sodium aluminate is disclosed.

19 Claims, 2 Drawing Figures

SODUIM ALUMINATE BASED ALUMINUM CITRATE

ALUMINUM CHLORIDE BASED ALUMINUM CITRATE

SODUIM ALUMINATE BASED ALUMINUM CITRATE

ALUMINUM CITRATE SOLUTION

BACKGROUND OF THE INVENTION

The present invention relates to solutions of aluminum citrate.

Aluminum citrate solutions have been found useful for crosslinking polymers such as carboxymethylcellulose (CMC) or partially hydrolyzed polyacrylamide. The phenomenon has found application in enhanced oil recovery processes. An example of such is disclosed in U.S. Pat. No. 3,762,476. The in situ gelling of the polymers results in blocking of highly permeable zones which can allow one to recover oil which otherwise could not be recovered by conventional means.

In the past, dilute solutions have been prepared in the field by dissolving aluminum sulfate and sodium citrate in water. If the concentration of such solutions is increased, it has been noted that in some formations precipitates formed as a result of interaction between the sulfate ions and alkaline earth metal cations in the formation or in the water employed. Such precipitations have been found undesirable since they can result in formation blockages where they are not wanted.

In view of the large quantities of aluminum citrate that are employed in such enhanced oil recovery processes, it is obviously desirable to be able to have available stable, highly concentrated solutions that are substantially free of particulate matter. It is generally desired to have an aluminum citrate solution which, after 100 hours at 100° F., will not contain over about 3 weight percent of solid precipitates. Some such solutions have in the past been made by reacting aluminum chloride, citric acid, and either ammonia or sodium hydroxide.

The present invention provides an alternative method for preparing stable aqueous aluminum citrate solutions. In some embodiments, it is possible to produce aluminum citrate compositions economically competitive with those produced from aluminum chloride.

SUMMARY OF THE INVENTION

In accordance with the present invention, an aqueous aluminum citrate solution is prepared by combining citric acid or sodium citrate and an aqueous solution of sodium aluminate under suitable reaction conditions.

Further, in accordance with the present invention there is provided an aqueous aluminum citrate solution having an infrared absorption spectrum different from that of aqueous aluminum citrate solutions formed from aluminum chloride.

Still further in accordance with this invention, there is provided a method for preparing a highly concentrated stable aluminum citrate solution that is substantially free of gel and particulate matter.

DETAILED DESCRIPTION OF THE INVENTION

Figure 1:
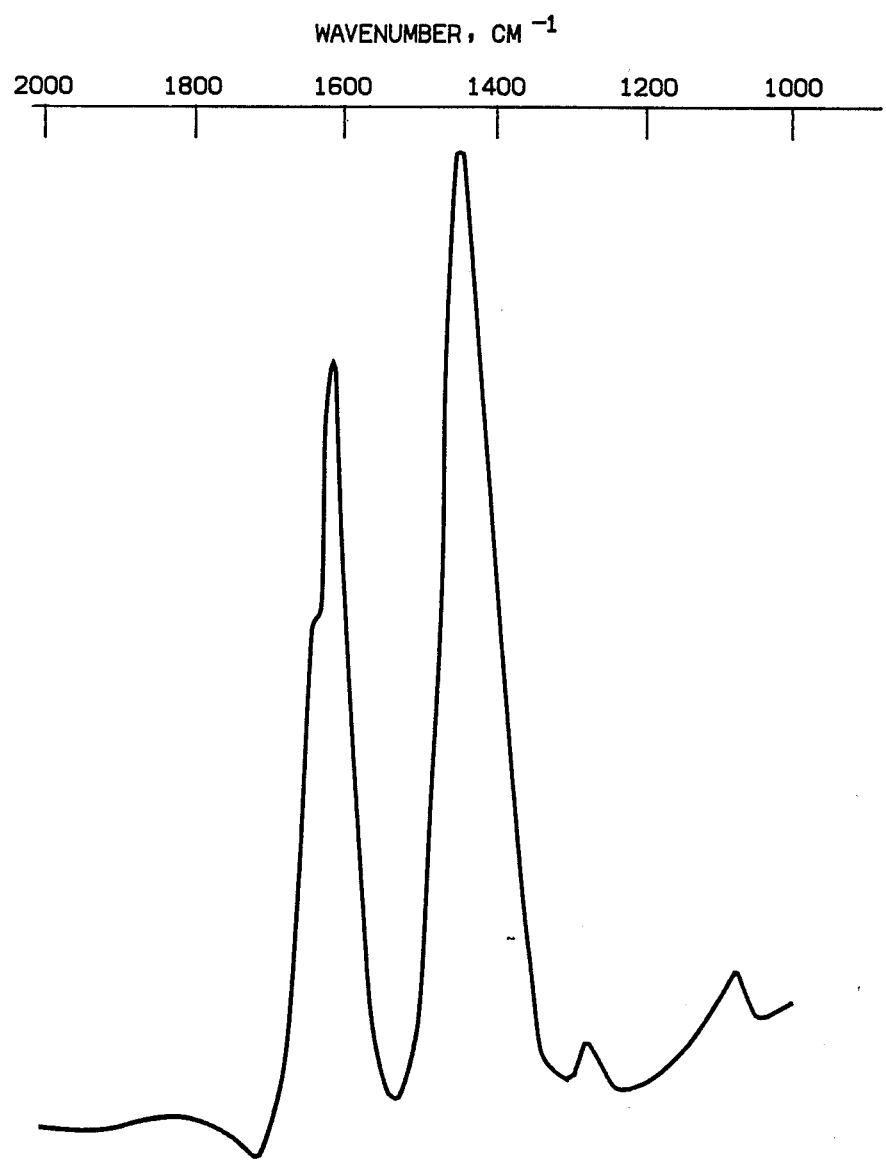
FIG. 1 is a drawing of a portion of the infrared spectrum of a solution of aluminum citrate prepared from aluminum trichloride.

The aqueous solution of sodium aluminate can be obtained in any suitable manner. One alternative involves the dissolution of aluminum metal in aqueous caustic. Another involves the dissolution of solid sodium aluminate in water. Still another alternative involves the reaction of alumina with aqueous caustic. Still another alternative involves the use of commercially available stable aqueous solutions of sodium aluminate.

In view of the fact that it is desirable to obtain a stable concentrated solution of aluminum citrate useful for gelling of CMC or partially hydrolyzed polyacrylamide in enhanced oil recovery, the water employed should preferably be relatively free of ions present in amounts sufficient to result in the formation of any significant amounts of precipitates. The presence of salts can affect the mole ratio of aluminum to citrate that is needed to prevent the aluminum from precipitating and can also affect the time required for the solution to effect gelling of CMC or partially hydrolyzed polyacrylamide solutions. The use of distilled water is, however, not required. Some naturally available water is suitable. The suitability of water sources can be determined by routine evaluation. As a general rule, however, the amount of any single metal in the water should not exceed about 300 ppm. More preferably, water is employed in which no individual metal ion capable of forming insoluble salts is present in an amount greater than 12 parts per million. Water having a total salt content of 1 weight percent or less has generally been found suitable. Generally, it has been found desirable for the aqueous solution of aluminum citrate to contain less than 5 weight percent salt.

When the aqueous solution of sodium aluminate is formed from aluminum metal or alumina, it is preferable to use an excess of caustic in order to minimize the formation of insoluble aluminum hydroxide composition. Typically, the molar ratio of sodium hydroxide to aluminum is at least about 1.25:1. Likewise, if one forms the solution by dissolving solid sodium aluminate in water it is preferable to do so in the presence of a sufficient amount of hydroxyl ions to minimize the formation of insoluble aluminum compounds. While the aluminum citrate of the present invention can be prepared in the presence of foreign solid products, in order for the product to be most acceptable for use in enhanced oil recovery applications, it is best to use sodium aluminate solutions that are substantially free of insoluble solids. Such solutions can be obtained by filtration if necessary.

When the sodium aluminate solution is formed from aluminum metal, it may be desirable to carry out the dissolution in the presence of sodium citrate. The sodium citrate allows one to reduce the amount of sodium hydroxide needed for forming the sodium aluminate solution. When used for this purpose, the molar ratio of sodium citrate to aluminum is generally less than 1/1 and more typically in the range of about 0.1/1 to about 0.6/1. Preferably even when the aluminum is dissolved in the presence of sodium citrate the sodium hydroxide is employed in an amount such that the molar ratio of NaOH to Al is at least about 1/1.

The currently preferred aqueous sodium aluminate solutions are those sold commercially by Nalco Chemical Company. One of these solutions currently identified as 2375 is sold as a product having approximately 41 weight percent $Na_2Al_2O_4$ and about 3.5 weight percent free sodium hydroxide. A more preferred Nalco product currently identified as 2372 is sold as a product having about 32 weight percent Na₂Al₂O₄ and about 8 weight percent free sodium hydroxide. Preferably fresh commercial solutions should be used as there is a tendency for neutralization to occur upon standing and such neutralization increases the likelihood of the presence of undesirable solids in the aluminum citrate solution.

For reasons of economics and performance, it is currently preferred to use citric acid rather than sodium citrate. Either can be added as a solid but preferably they are added as an aqueous solution. The temperature at which the citrate and the sodium aluminate are combined can affect the extent to which one obtains a solution substantially free of insoluble solids. Higher temperatures were found to favor the formation of insoluble aluminum hydroxides. Typically the temperature of the reaction medium should be below 40° C., preferably below 27° C. and more generally in the range of 7° C. to 24° C. When citric acid is employed, the acid is preferably added slowly to the sodium aluminate solution. If the aluminate solution is instead added to a solution of citric acid it has been noted that the localized heat of reaction is so great that undesirable levels of insolubles are formed. Even when the citric acid is added to the aluminate solution, agitation has been found to help minimize undesirable levels of localized heat of reaction. This is of particular importance when one is preparing large batches of the aluminum citrate because if the stirring is inadequate precipitates form. Coworkers of the present applicants have also discovered that when stirring of the reaction medium is used better results are obtained if the reaction is conducted under an atmosphere substantially free of carbon dioxide. Typically this could be done by carrying out the reaction under an atmosphere consisting of nitrogen, argon, or some other substantially inert gas.

The mole ratio of aluminum to citrate ion employed can vary over a fairly wide range. Generally, however, that molar ratio should be greater than 1/1 and less than 3/1. Solutions prepared with an aluminum to citrate molar ratio of less than 1.4/1 did not exhibit the ability to gel CMC that would be desired for most enhanced oil recovery processes. The optimum aluminum to citrate molar ratio for solutions to be used as gelling agents has been found to be in the range of about 1.7/1 to about 2/1.

The amount of sodium aluminate employed can vary over a wide range also. However, when amounts are used such that the solution contains around 3.5 weight percent aluminum, the mixture takes on the appearance of a suspension rather than a solution. Thus for the preferred solution, the weight percent of aluminum should be no greater than about 3 weight percent. If more aluminum is used then a stable solution can be prepared by dilution with suitable water.

In order for the solution to remain stable over any significant amount of time, it is necessary to neutralize the product of the citrate and aluminate reaction with a stabilizing amount of a suitable neutralizing agent. Examples of suitable neutralizing agents include inorganic acids and organic acids. Typical acids that have been used include hydrochloric acid, nitric acid, and glacial acetic acid. One of the applicants has also discovered that $AlCl_3$ can be used as the neutralizing agent. The currently preferred neutralizing agent is hydrochloric acid. Neutralizing agents containing multivalent anions, i.e., $SO_4^{-2}$ or $PO_4^{-3}$ are generally not to be used since such anions encourage the formation of insoluble precipitates in well formations. For best results the neutralizing agent should also be added under conditions such that the temperature remains below 40° C., more preferably below 30° C. The desired level of neutralization generally occurs when the pH has been lowered to a pH in the range of 6 to 9, more typically in the range of 6.5 to 8, and still more typically about 6.5 to 7.

A better understanding of the present invention and its advantages will be provided by reference to the following examples:

EXAMPLE I

Forty grams of NaOH was dissolved in 100 gms of distilled water. Ice was added until the solution was cooled to 50° F. Then 10 grams of aluminum powder was added and the mixture stirred with occasional additions of more ice to keep the temperature at or below 75° F. After approximately 30 minutes, the vigor of the reaction subsided and the temperature remained at around 25° F. without further cooling. The beaker was allowed to stand in a fume hood for 1½ days. The solution contained a small amount of orange sediment that was light and flocculent. The sediment was suspended by agitation and 30 percent (182 gm) of the total solution (i.e., 3 gm Al) was transferred to another beaker. Then 12.6 gm of citric acid was added to the solution. The acid dissolved and there was no visual change in the solution. The pH was then 11.84. Concentrated HCl was added dropwise until a pH of 7.15 was reached. After this neutralization was reached, the temperature of the solution was 95° F. After sitting in a fume hood the pH changed to 8.34. The resulting solution was set aside for over a month and still remained a clear, yellow solution containing a minor amount of orange sediment.

In another run, 10.7 gms of citric acid was added to 182 gm of the solution resulting from the reaction of the caustic and aluminum. The pH of the resulting solution was 12.2. Concentrated nitric acid was added slowly until a pH of 7.4 was reached. After standing in an open beaker at room temperature for five days, the solution weighed 131 gm and had a pH of 8.38. The solution was a clear, yellow solution containing a minor amount of orange solid on the bottom. There was no apparent change in the solution after storage for a month.

The effectiveness of the two aluminum citrate solutions in gelling carboxymethylcellulose was evaluated using a standard test. Five grams of carboxymethylcellulose (CMC) was added to one liter of deionized water while stirring until it dissolved. Ten grams of KCl was added and the solution cooled to room temperature. The pH was then adjusted to 3.6 with concentrated HCl. The gel test involved adding 0.5 ml of the aluminum citrate solution to 15 ml of the CMC solution. The mixture was then shaken for 30 seconds and then observed to determine how long it took until the mixture took on a jelly like texture. The HCl neutralized aluminum citrate (having a calculated Al/citrate molar ratio of about 1.7/1) took approximately 60 minutes to form a non-rigid gel. The nitric acid neutralized aluminum citrate (having a calculated Al/citrate molar ratio of about 2/1) was almost gelled at 10 minutes and completely jelled at 20 minutes. This demonstrates that the aqueous aluminum citrate solution formed from aluminum is capable of functioning in the same manner as the commercially available aluminum citrate prepared from aluminum chloride.

EXAMPLE II

This example demonstrates the production of a solution of aluminum citrate from aluminum trichloride. To a 500 ml round bottom flask was added 59.6 g of $AlCl_3$ and 80 ml distilled water while agitating in an ice bath. Agitation was continued while 36.8 g of sodium citrate was slowly added. The temperature of the reaction mixture was maintained at a level no higher than 14° C. Ammonium hydroxide was added slowly to raise the pH to about 6.8. The temperature was maintained below 20° C.

The suitability of the solution as a gelling agent for carboxymethylcellulose (CMC) was evaluated. The CMC solution was prepared by adding 5 g of CMC to 1 liter of deionized water while stirring. Ten grams of potassium chloride was then dissolved and the pH adjusted to 3.6 with concentrated HCl. The gel test involved adding 1 ml of the aluminum citrate solution to 30 ml of the CMC solution, shaking for 30 seconds and then noting how long it took until the material took on a jelly-like texture. The aluminum citrate prepared from $AlCl_3$ was found to be a suitable gelling agent.

The infrared absorption spectrum of the aluminum citrate was obtained using Attenuated Total Reflectance Fourier transform infrared spectroscopy. The reference solution was distilled water. The resulting absorption spectrum is shown in FIG. 1. The tallest absorption peak is located at about 1440 cm$^{-1}$. The next tallest absorption peak is located at about 1610 cm$^{-1}$. The infrared spectrum of a commercially available $AlCl_3$ based aluminum citrate solution obtained from Magnablend Company of Dallas, Tex., also showed basically the same type of peak placement and the relative intensity of those two peaks was substantially the same.

EXAMPLE III

This example demonstrates the production of a solution of aluminum citrate using the Nalco Chemical Company sodium aluminate solution which was sold as containing 41 weight percent $Na_2Al_2O_4$. To a 500 ml round bottom flask was added 50 g of the sodium aluminate solution and 80 ml of distilled water while agitating in an ice bath. Agitation was continued while 23.73 g of citric acid was slowly added. The temperature was kept below 20° C. The pH of the resulting solution was brought to about 7 with concentrated HCl while keeping the temperature of the reaction mixture below 20° C. When used in the gel test as described in the preceding example, this aluminum citrate solution provided a gel within 10 minutes. This time for gellation is at least competitive with the $AlCl_3$ prepared solution.

Figure 2:
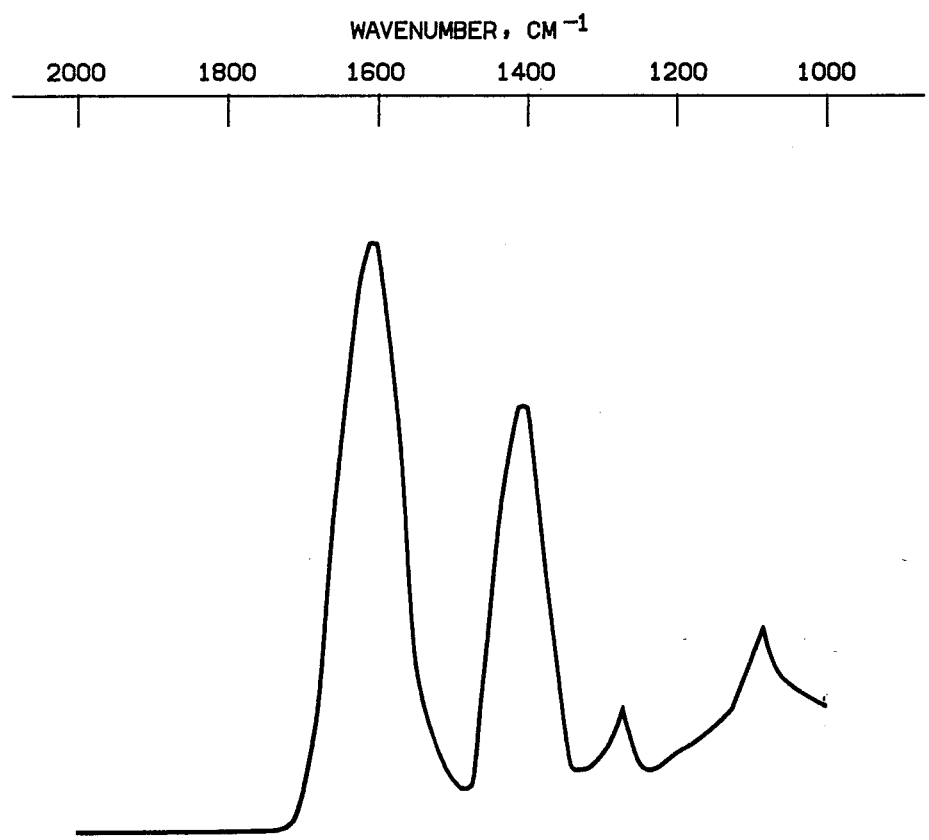
FIG. 2 is a drawing of a portion of the infrared spectrum of a solution of aluminum citrate prepared in accordance with the present invention.

The Fourier transform infrared absorption spectrum of the solution using distilled water as the reference solution is shown in FIG. 2. The tallest absorption peak is located at about 1600 cm$^{-1}$ and the next tallest at about 1400 cm$^{-1}$. It should be noted that this placement of the absorption peaks in the range of 2000 cm$^{-1}$ to 1000 cm$^{-1}$ is opposite that of aluminum citrate prepared from $AlCl_3$. Aluminum citrate solutions prepared using sodium aluminate prepared from aluminum metal as described in Example I also have this same type of infrared absorption spectrum, i.e., maximum absorption around 1600 cm$^{-1}$ and next largest absorption around 1400 cm$^{-1}$.

EXAMPLE IV

This example demonstrates the production of a solution of aluminum citrate using the Nalco Chemical Company sodium aluminate solution sold as containing 32 weight percent $Na_2Al_2O_4$. In this run, 64 g of the sodium aluminate solution and 80 ml of distilled water were mixed in a flask in an ice bath. Mixing was continued while 23.72 g of citric acid was added. The pH was allowed to stabilize and then reduced to about 6.8 with concentrated HCl keeping the temperature below 25° C. Water was then added to give a solution having a theoretical 3.07 weight percent aluminum.

When used in the gel test of Example II, this aluminum citrate solution also gave a gel within 10 minutes.

The Fourier transform infrared absorption spectrum of solutions prepared in this manner also have their tallest absorption around 1600 cm$^{-1}$ and their next tallest absorption around 1400 cm$^{-1}$.

EXAMPLE V

This example demonstrates the production of a solution of aluminum citrate using sodium citrate and the sodium aluminate solution that was used in the preceding example. Here again, 64 g of the sodium aluminate solution was mixed with 80 ml of distilled water. Then 36.7 g solid sodium citrate was added slowly with mixing using a water bath. The temperature never exceeded about 30° C. Then HCl was added to give a pH of about 6.8. Then distilled water was added in an amount sufficient to give a theoretical 3 weight percent aluminum.

When used in the CMC gel test as described in Example II, no gel was observed even an hour after the aluminum citrate solution was combined with the CMC solution. It is thought that the poorer gelling observed with this solution is due to the larger ion concentration which follows from the use of the sodium salt rather than citric acid.

In yet another run, an aluminum citrate solution was prepared from the same reactants however by adding the sodium aluminate solution to the mixture of sodium citrate and water. The resulting solution produced gel in the above-described gel test but only after about 2 days.

Even though the aluminum citrate prepared using sodium citrate exhibits less rapid gelling than one prepared from citric acid, it is still quite useful for enhanced recovery operations in which rapid gelling is not needed. The infrared absorption spectra of aluminum citrate solutions prepared from sodium citrate determined using Fourier transform infrared spectroscopy also have maximum peak locations like those of the citric acid produced solution.

What is claimed is:

1. In an enhanced oil recovery process wherein a polymer selected from carboxymethylcellulose and partially hydrolyzed polyacrylamide is contacted with an aluminum citrate solution, the improvement comprising using as the aluminum citrate solution a stable aqueous solution of aluminum citrate having an aluminum to citrate molar ratio of 1.4/1 to 2.3/1 prepared by combining citric acid or sodium citrate and an aqueous solution of sodium aluminate at a temperature below 40° C. followed by neutralization with organic or inorganic acid to a pH in the range of 6 to 9 conducted at a temperature below 40° C.

2. A process according to claim 1 wherein said aqueous solution contains no more than about 3 weight percent aluminum.

3. A process for producing a stable aqueous solution of aluminum citrate wherein the molar ratio of aluminum to citrate is in the range of 1.4/1 to 2.3/1 comprising combining citric acid or sodium citrate and an aqueous solution of sodium aluminate at a temperature below 40° C. followed by neutralization with organic or inorganic acid to a pH in the range of 6 to 9 conducted at a temperature below 40° C.

4. A process according to claim 3 wherein citric acid is added to an aqueous solution of sodium aluminate.

5. A process according to claim 4 which yields an aqueous solution wherein the tallest absorption peak in the area bounded by wavenumbers 2000 cm$^{-1}$ and 1000 cm$^{-1}$ in the infrared absorption spectrum of the solution obtained using Attenuated Total Reflectance Fourier transform infrared spectroscopy with distilled water as the reference solution is in the range of 1550 cm$^{-1}$ to 1650 cm$^{-1}$.

6. A process according to claim 4 wherein said sodium aluminate is prepared by dissolving aluminum metal with an aqueous solution of sodium hydroxide in the presence of sodium citrate.

7. A process according to claim 6 wherein the molar ratio of sodium citrate to aluminum is in the range of 0.1/1 to 0.6/1.

8. A process according to claim 7 wherein the molar ratio of sodium hydroxide to aluminum is at least 1/1 but less than 1.25/1.

9. A process according to claim 8 which yields an aqueous solution wherein the tallest absorption peak in the area bounded by wavenumbers 2000 cm$^{-1}$ and 1000 cm$^{-1}$ in the infrared adsorption spectrum of the solution obtained using Attenuated Total Reflectance Fourier transform infrared spectroscopy with distilled water as the reference solution is in the range of 1550 cm$^{-1}$ to 1650 cm$^{-1}$.

10. A process according to claim 4 wherein said neutralization is conducted with hydrochloric acid.

11. A process according to claim 10 wherein said solution contains less than 3.5 weight percent aluminum and is capable of providing a gel in the CMC test of Example II within 30 minutes.

12. A process according to claim 4 wherein said sodium aluminate is prepared by dissolving aluminum metal with an aqueous solution of sodium hydroxide wherein the molar ratio of sodium hydroxide to aluminum is at least about 1.25/1.

13. A process according to claim 4 wherein the citric acid and the sodium aluminate are mixed at a temperature in the range of about 7° C. to about 24° C.

14. A process according to claim 6 wherein the molar ratio of aluminum to citrate is in the range of 1.7/1 to 2/1.

15. A process according to claim 29 wherein a solution is produced containing about 3 weight percent aluminum.

16. A process according to claim 15 wherein the neutralization is to a pH in the range of about 6.5 to 8.

17. A process according to claim 15 wherein the neutralization is to a pH of about 6.5 to 7.

18. A process according to claim 4 wherein said neutralization is conducted by the addition of aluminum trichloride.

19. A process according to claim 3 wherein said neutralization is conducted by the addition of aluminum trichloride.

* * * * *